(12) United States Patent
Honda (10) Patent No.: US 6,660,985 B2
(45) Date of Patent: Dec. 9, 2003

(54) OPTICAL PICK-UP DEVICE AND OBJECTIVE LENS THEREFOR

(75) Inventor: Koji Honda, Hachioji (JP)

(73) Assignee: Konica Corporation, Tokyo (JP)

( * ) Notice: Subject to any disclaimer, the term of this patent is extended or adjusted under 35 U.S.C. 154(b) by 262 days.

(21) Appl. No.: 09/938,889

(22) Filed: Aug. 27, 2001

(65) Prior Publication Data

US 2002/0050555 A1 May 2, 2002

(30) Foreign Application Priority Data

Sep. 1, 2000 (JP) .......................................... 2000-265296

(51) Int. Cl.⁷ .............................................. G02B 27/40
(52) U.S. Cl. ................................ 250/201.5; 369/44.23; 369/112.01
(58) Field of Search ........................... 250/201.5, 201.2, 250/201.4; 369/44.14, 44.23, 44.25, 44.32, 44.37, 44.41, 112.01, 112.03, 112.08, 112.2, 112.23, 112.24; 359/719, 718

(56) References Cited

U.S. PATENT DOCUMENTS 6,313,956 B1 * 11/2001 Saito ........................ 250/201.5
6,411,587 B1 * 6/2002 Arai et al. ............. 369/112.01
6,563,099 B2 * 5/2003 Kimura et al. ........... 250/201.5

* cited by examiner

*Primary Examiner*—Kevin Pyo
(74) *Attorney, Agent, or Firm*—Finnegan, Henderson, Farabow, Garrett & Dunner, L.L.P.

(57) ABSTRACT

In an optical pickup apparatus provided with a first light source; a second light source; a converging optical system having an objective lens provided with a diffractive section, and an optical detector, the optical detector comprises a central light receiving section to detect a focusing condition and a peripheral light receiving section to detect a tracking error, and when information is reproduced from or recorded in the second optical information recording medium, a reflected light flux of the second light flux reflected from or a transmitted light flux of the second light flux transmitted through the second optical information recording medium is irradiated so as to cover the entire surface of the peripheral light receiving section.

20 Claims, 6 Drawing Sheets

OPTICAL PICK-UP DEVICE AND OBJECTIVE LENS THEREFOR

BACKGROUND OF THE INVENTION

The present invention relates to an optical pick-up device and an objective lens, and for example, to an optical pick-up apparatus by which the information recording and/or information reproducing can be conducted on two optical information recording media having different transparent substrate thickness, and to an objective lens for use in it.

Recently, as the a short wavelength red semiconductor laser is put to practical use, the development of a DVD (digital versatile disk) which is the high density optical disk having the larger capacity whose dimension is about the same as the CD (compact disk) which is the conventional optical disk, that is, the optical information recording medium is advanced. In the optical system of the optical information recording and reproducing device whose medium is such the optical disk, in order to intend the increase of the density of the recording signal, it is required that the size of a spot converged onto the recording medium by the objective lens is reduced to a smaller one. Accordingly, there is the actual condition that the reduction of the wavelength of the laser as the light source and the increase of the NA of the objective lens are intended.

For example, in the optical pick-up device to conduct the recording and/or reproducing of the information on the DVD, when the short wavelength semiconductor laser of 655 nm is used as the light source, the numerical aperture NA on the optical disk side of the objective lens to converge such the laser light is about 0.6. In this connection, in the CD and DVD, there are various standards of optical disks, for example, a CD-R (recordable compact disk), and other than the CD and DVD, a MD (mini disk) is put in the market and is widely spread.

On the one hand, the light source having the wavelength $\lambda$=785 nm is necessary in the optical pick-up device to conduct the recording and/or reproducing of the information on the CD-R, however, in the other optical disks, the light source having the wavelength other than the specific light source wavelength can be used, and in such the case, the necessary numerical aperture NA is changed corresponding to the light source wavelength $\lambda$ to be used. For example, in the case of the CD, the necessary numerical aperture NA=$\lambda$ ($\mu$m)/1.73, and in the case of the DVD, the necessary numerical aperture NA=$\lambda$($\mu$m)/1.06, are respectively approximated as each NA. The numerical aperture in the present specification is the numerical aperture of the converging optical system viewed from the optical disk side, and the necessary numerical aperture is the numerical aperture calculated from a spot size d and the wavelength $\lambda$ to be used which are required on the recording surface of the optical disk, and generally, NA=0.83×$\lambda$÷d.

As described above, various optical disks having different transparent substrate thickness, recording density, and wavelength to be used, exist in the market, and to individual optical disk, it is a large burden for the user to purchase an exclusive information recording and reproducing apparatus by which the recording and/or reproducing of the information can be conducted. Accordingly, the information recording and reproducing apparatus provided with a compatible optical pick-up device which can cope with various optical disks, is proposed.

In such the optical pick-up device, when the luminous flux having different wavelengths is incident onto the substrates having different thickness, it is necessary that the spherical aberration is corrected to a value not larger than a predetermined amount, and it is necessary that, in order to make the writing and reading of the information adequate, the spot diameter of each luminous flux also comes into within a predetermined range.

In contrast to it, an optical pick-up device which is provided with individual converging optical systems respectively corresponding to different optical disks, and in which the converging optical systems are switched by the optical disks to be reproduced, is proposed. In such the optical pick-up device, when the luminous fluxes having the different wavelengths are incident onto the substrates having the different thickness, the spherical aberration can be corrected to an amount not larger than a predetermined amount, and the spot diameter of each luminous flux can also be within a predetermined range. However, in this optical pick-up device, because a plurality of converging optical systems are necessary, the structure becomes complicated, and so the cost is increased, which is not preferable.

To such the problem, an objective lens by which the luminous flux having not larger than a predetermined numerical aperture is converged into a spot light, and the luminous flux having not smaller than a predetermined numerical aperture is made a flare light, is now developed. According to such the objective lens, to the different optical information media such as the CD-R or DVD, a spot light which is necessary for recording or reproducing of the information can be obtained.

In this connection, generally, in the optical pick-up device, an optical detector to detect a tracking error by receiving the light reflected from the optical in formation recording medium is provided. In the conventional optical detector, because only a spot light is reflected from the optical information recording medium, so far as the spot light is irradiated onto the correct recording position on the optical information recording medium, there is a low possibility that the optical detector erroneously detect it. However, when the luminous flux is through the above-described objective lens, because the luminous flux more than a predetermined numerical aperture is irradiated onto the optical information recording medium as a flare light, when the reflected light is detected by the detector, there is a possibility of the false detection.

Namely, primarily, when light is irradiated correctly at a recording position on a optical information recording medium, there may be no deviation in light intensity of the light received by the detector. However, if the reflected light of flare light comes to be incident unevenly into the detector, a deviation in light intensity of the light received by the detector is caused by the uneven incidence or the light intensity becomes unstable. As a result, even if no tracking error takes place, there is a possibility to cause an erroneous detection to inform that a tracking error takes place.

SUMMARY OF THE INVENTION

An object of the present invention is, although a small number of optical elements or objective lens is used, to provide an optical pick-up device and an objective lens for use in the device, by which recording and/or reproducing of the information (hereinafter, called simply recording reproducing) can be conducted on the optical information recording media having different thickness, and the false detection for the tracking error can be suppressed.

The above object can be attained by the following structures.

An optical pickup apparatus for reproducing information from or recording information in at least two kinds of optical information recording medium, comprises:

a first light source to emit a first light flux having a first wavelength λ1;

a second light source to emit a second light flux having a second wavelength λ2(λ2>λ1);

a converging optical system having an objective lens provided with a diffractive section, to converge the first light flux emitted from the first light source through a transparent base board of a first optical information recording medium onto a recording surface and to converge the second light flux emitted from the second light source through a transparent base board of a second optical information recording medium onto a recording surface;

an optical detector to receive a reflected light flux and/or a transmitted light flux from the first and second optical information recording medium;

wherein the first light flux is irradiated to reproduce information from or to record information in the first optical information recording medium including a transparent base board having a thickness of t1 and the second light flux is irradiated to reproduce information from or to record information in the second optical information recording medium including a transparent base board having a thickness of t2(t2>t1);

wherein when a numerical aperture NA1 is a numerical aperture at an image side of the objective lens and necessary to reproduce information from or record in the first optical information recording medium, the converging optical system converges the first light flux on the information recording surface of the first optical information recording medium within the numerical aperture NA1 on a condition that wavefront aberration is 0.07λ1 rms or less, and when a numerical aperture NA2(NA2<NA1) is a numerical aperture at an image side of the objective lens and necessary to reproduce information from or record in the second optical information recording medium, the converging optical system converges the second light flux on the information recording surface of the second optical information recording medium within the numerical aperture NA2 on a condition that wavefront aberration is 0.07λ2 rms or less, wherein the optical detector comprises a central light receiving section to detect a focusing condition and a peripheral light receiving section to detect a tracking error, and when information is reproduced from or recorded in the second optical information recording medium, a reflected light flux of the second light flux reflected from or a transmitted light flux of the second light flux transmitted through the second optical information recording medium is irradiated so as to cover the entire surface of the peripheral light receiving section.

Further, the above object may be attained by the following preferable structures.

(1) An optical pick-up device described in (1) of the present invention is as follows. An optical pick-up device which has: the first light source to emit the first luminous flux with the first wavelength λ1; the second light source to emit the second luminous flux with the second wavelength λ2 (>λ1); a converging optical system including an objective lens provided with a diffractive section by which the first luminous flux emitted from the first light source is converged onto the information recording surface through a transparent substrate of the first optical information recording medium, and the second luminous flux emitted from the second light source is converged onto the information recording surface through a transparent substrate of the second optical information recording medium; and a optical detector to receive the reflected light and/or transmitted light from the first and second optical information recording media, and which reproduces the information from at least 2 kinds of optical information recording media, or records the information on the optical information recording media, wherein the first luminous flux is irradiated to reproduce the information from the first optical information recording medium having the first transparent substrate of the thickness t1, or to record the information, and the second luminous flux is irradiated to reproduce the information from the second optical information recording medium having the second transparent substrate of the thickness t2(>t1), or to record the information, and the converging optical system can converge the first luminous flux onto the information recording surface of the first optical information recording medium, on the condition that the wave front aberration is not larger than 0.07 λ1, within a predetermined numerical aperture NA1 on the image side of the objective lens necessary for recording or reproducing of the first optical information recording medium, and the second luminous flux onto the information recording surface of the second optical information recording medium, on the condition that the wave front aberration is not larger than 0.07 λ2, within a predetermined numerical aperture NA2 (<NA1) on the image side of the objective lens necessary for recording or reproducing of the second optical information recording medium, and the optical detector has a central light receiving section to receive the reflected light and/or transmitted light from the first and the second optical information recording media so as to detect a focusing condition, and a peripheral light receiving section to detect a tracking error, and when the second optical information recording medium is recorded or reproduced, because the reflected light reflected from the second optical information recording medium and/or the transmitted light transmitted through the second optical information recording medium by the second luminous flux transmitted through the objective lens, is irradiated in such a manner that at least the whole surface of the peripheral light receiving section is included, the false detection of the optical detector can be suppressed.

Figure 1:
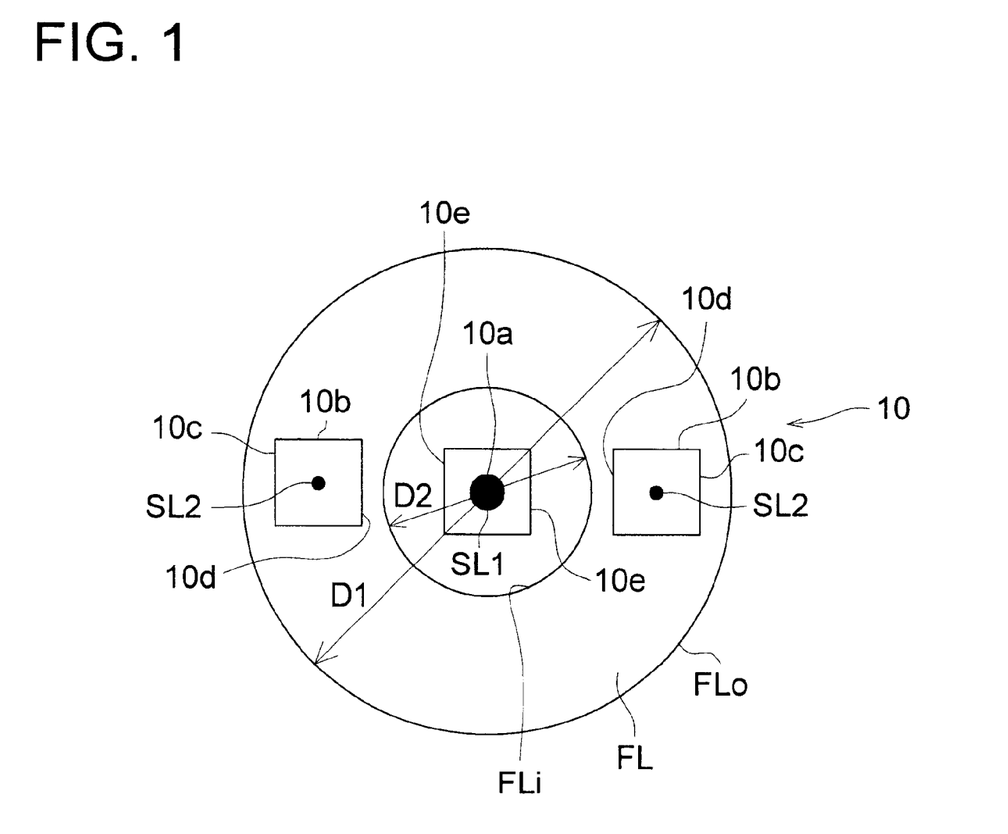
FIG. 1 is an outline view showing an optical detector of the present invention.

FIG. 1 is an outline view showing an optical detector of the present invention. In FIG. 1, a photo detector 10 which is an optical detector, has a central light receiving section 10*a* and a pair of peripheral light receiving section 10*b* arranged at an equal distance from the central light receiving section 10*a*.

On the one hand, by the second luminous flux transmitted through the objective lens, not shown, the reflected light reflected from the second optical information recording medium and or transmitted light transmitted through it, is largely changed corresponding to the transmission through either one of the inside or the outside of the predetermined numerical aperture NA2 of the objective lens. That is, by the second luminous flux transmitted through the inside of the predetermined numerical aperture NA2 of the objective lens, not shown, the spot light SL1 which is a portion of the reflected light reflected from the second optical information recording medium and/or transmitted light transmitted through it, is received by the central light receiving section 10*a* and is used for the detection of the focusing condition, and a remaining spot light SL2 is received by the peripheral light receiving section 10b and used for the detection of the existence of the tracking error.

In contrast to this, by the second light flux having passed through the outside of the numerical aperture NA2 of the un-illustrated objective lens, a part of the reflected light reflected from the second optical information recording medium or the transmitting light transmitting through the second optical information recording medium becomes flare light FL and is irradiated in almost a ring-shaped form onto a photo-detector 10 where a spot light SL1 is positioned at the center of the flare light FL as shown in FIG. 1. In addition to the ring-shaped flare light FL shown in FIG. 1, an almost ring-shaped flare light formed with a spot light SL2 positioned at the center of the ring-shaped flare light is also irradiated onto the photo-detector. However, the almost ring-shaped flare light is not illustrated in FIG. 1. Because a fact that the light other than the spot light SL2 is irradiated onto the peripheral light receiving section 10b, has the possibility that the false detection occurs, intrinsically, the avoidance is necessary, however, as in the present invention, when the flare light FL is uniformly irradiated so as to include the whole surface of the peripheral light receiving section 10b, because the optical intensity of the flare light FL is extremely lower than the light intensity of the spot light SL2, the peripheral light receiving section 10b does not detect the flare light FL, or only very low detection signal is generated, therefore, the possibility that the false detection is generated by the existence of the flare light FL, is very low. Further, in the case that the flare light is irradiated so as to cover the entire surface of the peripheral light receiving section 10b, the light intensity of the flare light received by the peripheral light receiving section 10b is relatively lower in the whole of the peripheral light receiving section 10b and become uniform. Accordingly, the flare light does not influenced the detection result of presence/absence of tracking error detected by the peripheral light receiving section 10b. Further, by the method as described above, the design work of the objective lens can be easily carried out, and the cost of the device can be reduced. In this connection, a fact that the flare light FL includes the whole surface of the peripheral light receiving section 10b, is satisfied when the whole of the light receiving surface is practically included.

(2) An optical pick-up device of (2) of the present invention is characterized in that: when the second optical information recording medium is recorded or reproduced, the reflected light reflected from the second optical information recording medium by the second luminous flux transmitted through the outside of the predetermined numerical aperture NA2 of the objective lens and/or the transmitted light transmitted through it, is irradiated ring-shaped band like, and the inner periphery of the ring-shaped band is positioned inside from the innermost edge of the peripheral light receiving section, and the outer periphery of the ring-shaped band is positioned outside from the outermost edge of the peripheral light receiving section.

In FIG. 1, because the inner diameter FLi of the ring-shaped band-like flare light FL is positioned inside from the innermost edge 10d of the peripheral light receiving section 10b, and the outer diameter FLo of the flare light FL is positioned outside from the outermost edge 10c of the peripheral light receiving section 10b, the whole surface of the peripheral light receiving section 10b can be included by such the flare light FL.

(3) An optical pick-up device of (3) of the present invention is characterized in that: the inner diameter (D2 in FIG. 1) on the information recording surface of the ring-shaped band is 0–20 $\mu$m. Generally, in the optical system for the optical detector, the lateral magnification m is 6–7, and on the optical detector, such the inner diameter is a value multiplied by $2 \cdot m \cdot NA2/(\tan(\arcsin NA2))$.

(4) An optical pick-up device of (4) of the present invention is characterized in that: the inner diameter (D2 in FIG. 1) on the information recording surface of the ring-shaped band is 10–20 $\mu$m.

(5) An optical pick-up device of (5) of the present invention is characterized in that: when the second optical information recording medium is recorded or reproduced, the reflected light reflected from the second optical information recording medium by the luminous flux transmitted through the outside of the predetermined numerical aperture NA2 of the objective lens and/or the transmitted light transmitted through it, is irradiated ring-shaped band like, and because the inner periphery of the ring-shaped band (FLi in FIG. 1) is positioned outside from the outermost edge (10e in FIG. 1) of the central light receiving section (10a in FIG. 1), the device can be made so that the flare light FL does not affect the bad influence on the detection of the spot light SL1 in the central light receiving section 10a.

(6) An optical pick-up device of (6) of the present invention is characterized in that: when the outer diameter on the information recording surface of the ring-shaped band is D1, and the inner diameter on the information recording surface of the ring-shaped band is D2, because (D1−D2)/2>15 $\mu$m, the flare light FL can be irradiated so that the whole surface of the peripheral light receiving section 10b is included.

(7) An optical pick-up device of (7) of the present invention is characterized in that: the reflected light reflected from the first optical information recording medium by the first luminous flux transmitted through the objective lens and/or the transmitted light transmitted through it, and the reflected light reflected from the second optical information recording medium, transmitted through the inside of the predetermined numerical aperture NA2 of the objective lens, and/or transmitted light transmitted through it, are irradiated spot-like in the central light receiving section.

(8) An objective lens of (8) of the present invention, which is an objective lens for the optical pick-up device having: the first light source to emit the first luminous flux at the first wavelength $\lambda 1$; the second light source to emit the second luminous flux at the second wavelength $\lambda 2$ ($>\lambda 1$); the converging optical system including the objective lens provided with the diffractive section, by which the first luminous flux emitted from the first light source is converged onto the information recording surface through the transparent substrate of the first optical information recording medium, and the second luminous flux emitted from the second light source is converged onto the information recording surface through the transparent substrate of the second optical information recording medium; and the optical detector to receive the reflected light from the first and the second optical information recording media and/or the transmitted light, and which is an objective lens for the optical pick-up device by which the information is reproduced from at least 2 kinds of optical information recording media, or the information is recorded in the optical information recording media, wherein the first luminous flux is irradiated to reproduce the information from the first optical information recording medium having the first transparent substrate of the thickness t1, or to record the information, and the second luminous flux is irradiated to reproduce the information from the second optical information recording medium having the second transparent substrate of the thickness t2 ($>$t1), or to record the information, and the converging optical system can converge the first luminous flux onto the information recording surface of the first optical information recording medium, within the predetermined numerical aperture NA1 on the image side of the objective lens necessary for the recording or reproducing of the first optical information recording medium, on the condition that the wave front aberration is not larger than 0.07 λ1, and the second luminous flux onto the information recording surface of the second optical information recording medium, within the predetermined numerical aperture NA2 (<NA1) on the image side of the objective lens necessary for the recording or reproducing of the second optical information recording medium, on the condition that the wave front aberration is not larger than 0.07 λ2, and the optical detector has the central light receiving section to receive the reflected light from the first and the second optical information recording media and/or transmitted light transmitted through them so as to detect a focusing condition, and the peripheral light receiving section to detect a tracking error, and when the second optical information recording medium is recorded and reproduced, the reflected light from the second optical information recording medium and/or transmitted light transmitted through it, by the second luminous flux transmitted through the objective lens, is irradiated so that at least the whole surface of the peripheral light receiving section is included.

By using the objective lens of the present invention, in the optical pick-up apparatus, the recording and/or reproducing of the information can be conducted on a plurality of optical information recording media while the structure of the converging optical system is simple, and the possibility of the false detection in the optical detector can be suppressed.

(9) An optical pick-up device using the objective lens of (9) of the present invention is characterized in that: when the second optical information recording medium is recorded or reproduced, the reflected light reflected from the second optical information recording medium by the second luminous flux transmitted through the outside of the predetermined numerical aperture NA2 of the objective lens and/or transmitted light transmitted through it, is irradiated ring-shaped band-like, and the inner periphery of the ring-shaped band is positioned inside from the innermost edge of the peripheral light receiving section, and the outer periphery of the ring-shaped band is positioned outside from the outermost edge of the peripheral light receiving section.

(10) An optical pick-up device using the objective lens of (10) of the present invention is characterized in that: the inner diameter of the ring-shaped band on the information recording surface is 0–20 μm.

(11) An optical pick-up device using the objective lens of (11) of the present invention is characterized in that: the inner diameter of the ring-shaped band on the information recording surface is 10–20 μm.

(12) An optical pick-up device using the objective lens of (12) of the present invention is characterized in that: when the second optical information recording medium is recorded or reproduced, the reflected light reflected from the second optical information recording medium by the second luminous flux transmitted through the outside of the predetermined numerical aperture NA2 of the objective lens and/or transmitted light transmitted through it, is irradiated ring-shaped band-like, and the inner periphery of the ring-shaped band is positioned outside from the outermost edge of the central light receiving section.

(13) An optical pick-up device using the objective lens of (13) of the present invention is characterized in that: when the outer diameter of the ring-shaped band on the information recording surface is D1, and the inner diameter of the ring-shaped shaped band on the information recording surface is D2, (D1−D2)/2>15 μm.

(14) An optical pick-up device using the objective lens of (14) of the present invention is characterized in that: the reflected light reflected from the first optical information recording medium by the first luminous flux transmitted through the objective lens, and/or the transmitted light transmitted through it, and the reflected light reflected from the second optical information recording medium, transmitted through the inside of the predetermined numerical aperture NA2 of the objective lens, and/or the transmitted light transmitted through it, are irradiated spot-like in the central light receiving section.

The diffractive pattern (or diffractive section) used in the present specification is a mode (or surface) in which a relief is provided on the surface of the optical element, for example, the lens, and a function in which an angle of the light ray is changed by the diffraction is provided, and when there is an area in which the diffraction is generated, or not generated in one optical surface, it means the area in which the diffraction is generated. As the shape of the relief, for example, on the surface of the optical element, it is formed as the almost concentric circle ring-shaped band around the optical axis, and when its section is viewed on the plane including the optical axis, it is well known that each ring-shaped band has the saw-toothed shape, and the shape of the relief includes such the shape.

In the present specification, the objective lens means, in a narrow meaning, a lens having a converging function arranged opposite to the optical information recording medium at the position of the most optical information recording medium side, under the condition that the optical information recording medium is loaded in the optical pick-up device, and in a wide meaning, it means, together with the lens, a lens group which can be operated at least in its optical axis direction by an actuator. Herein, such the lens group means lenses at least more than one piece of lens. Accordingly, in the present specification, the numerical aperture NA on the optical information recording medium side of the objective lens means the numerical aperture NA of the luminous flux emitted from the lens surface positioned on the most optical information recording medium side of the objective lens onto the optical information recording medium side. Further, in the present specification, the numerical aperture NA shows the numerical aperture regulated by the regulation of respective optical information recording medium, or the numerical aperture of the objective lens of the diffractive marginal performance by which the spot diameter necessary for recording or reproducing the information can be obtained corresponding to the wavelength of the light source to be used, for respective optical information recording medium. In this connection, the objective lens is preferably a single lens.

In the present specification, as the optical information recording medium (optical disk), for example, each kind of CDs such as CD-R, CD-RW, CD-Video, CD-ROM, and each kind of DVDs such as DVD-ROM, DVD-RAM, DVD-R, DVD-RW, DVD+RW, DVD-Video, and the disk-like present optical information recording medium such as an MD, and next generation recording medium are also included. The transparent substrate exists on the information recording surface of many optical information recording media. However, the media in which the thickness of the substrate is close to almost zero, or there is no transparent substrate, exist or are proposed. For the convenience of the explanation, there is a case in which "through the transparent substrate" is described in the present specification, and such the case includes also the case where the thickness of the transparent substrate is zero, that is, there is no transparent substrate.

In the present specification, the recording and reproducing of the information means that the information is recorded onto the information recording surface of the optical information recording medium, and the information recorded on the information recording surface is reproduced. The optical pick-up device of the present invention, may be the device used for conducting only the recording or reproducing, or the device used for conducting both the recording and reproducing. Further, the optical pick-up device may be the device used for conducting the recording for one information recording medium, and for conducting reproducing for the other information recording medium, or used for conducting recording or reproducing for one information recording medium, and for conducting both the recording and reproducing for the other information recording medium. In this connection, the reproducing used herein includes simple reading of the information.

The optical pick-up device of the present invention can be installed in each kind of players or drives, or AV devices in which these are mounted, personal computer, and the recording and/or reproducing device of the audio and/or image of the other information terminal equipments.

Referring to the drawings, preferred embodiments of the present invention will be described below. The objective lens of the present embodiment has the diffractive ring-shaped band as the diffractive section. Generally, the pitch of the diffractive ring-shaped band (position of each ring-shaped band) is defined by using the phase difference function or the optical path difference function, which will be detailed in the later embodiment. Specifically, the phase difference function $\Phi b$ is expressed by the following [mathematical expression 1] in the radian as the unit, and the optical path difference function $\Phi B$ is expressed by the [mathematical expression 2] in mm as the unit.

$$\Phi_b = \sum_{i=0}^{\infty} b_{2i} h^{2i}$$ [Mathematical expression 1]

$$\Phi_B = \sum_{i=0}^{\infty} B_{2i} h^{2i}$$ [Mathematical expression 2]

In these 2 expression methods, the units are different, however, these are equal in the meaning for expressing the pitch of the diffractive ring-shaped band. That is, for the blazed wavelength $\lambda$ (mm unit), when the coefficient b of the phase difference function is multiplied by $\lambda/2\pi$, it can be converted into the coefficient B of the optical path difference function, and inversely, when the coefficient B of the optical path difference function is multiplied by $2\pi/\lambda$, it can be converted into the coefficient b of the phase difference function.

Now, for simplification of the explanation, the diffractive lens using the first diffractive light will be described, and in the case of the optical path difference function, the ring-shaped band is notched every time when the function value exceeds the integer times of the blazed wavelength $\lambda$, and in the case of the phase difference function, the ring-shaped band is notched every time when the function value exceeds the integer times of $2\pi$.

For example, a lens in which the diffractive ring-shaped band is notched on the side surface of the material of the cylindrical both planes having no refraction power, is supposed, and when the blazed wavelength is 0.5 $\mu m$=0.0005 mm, and the secondary coefficient (second power term) of the optical path difference function is −0.05 (when it is converted into the secondary coefficient of the phase difference function, it corresponds to −628.3), and all other coefficients are zero, the radius of the first ring-shaped band h=0.1 mm, and the radius of the second ring-shaped band h=0.141 mm. Further, it is well known that the focal distance f of this diffractive lens is, for the secondary coefficient B2 of the optical path function=−0.05, f=−1/(2·B2)=10 mm.

Now, when the above definition is used as the basis, by making the secondary coefficient of the phase difference function or the optical path difference function a value other than zero, the power can be provided on the lens. Further, when the coefficient other than the secondary coefficient of the phase difference function or the optical path difference function, for example, the 4-th order coefficient, 6-th order coefficient, 8-th order coefficient, and 10-th order coefficient, are made a value other than zero, the spherical aberration can be controlled. In this connection, herein, "to control" means that the spherical aberration which is possessed by the a portion having the refraction power is corrected by generating the inverse spherical aberration, or the spherical aberration of the whole is made a desired value.

DETAILED DESCRIPTION OF THE PREFERRED EMBODIMENT

EXAMPLE

A specific example of the objective lens will be described below.

The objective lens for the optical pick-up devices in examples 1–2, has the aspherical shape expressed by the following [Mathematical expression 3] on the both surfaces of the optical surface.

$$Z = \frac{h^2/r}{1+\sqrt{1-(1+\kappa)(h/r)^2}} + \sum_{i=0}^{\infty} A_{2i} h^{2i}$$ [Mathematical expression 3]

Where, Z is an axis in the optical axis direction (the advancing direction of the light is defined as the positive), h is an axis perpendicular to the optical axis (height from the optical axis), r is a paraxial radius of curvature, $\kappa$ is a conical coefficient, and A is an aspherical surface coefficient.

In this connection, the objective lens of the present example which will be described later, has the diffractive ring-shaped band expressed by different optical path difference functions bounded by the height hb from the optical axis. In the present example, in the diffractive ring-shaped band on the boundary of the height hb from the optical axis, the ring-shaped band width is short and the ring-shaped band width is an imperfect shape, however, in the present invention, the ring-shaped band in which the value of $A_O$ corresponding to the lens thickness of the area of the height $h \geq hb$ from the optical axis is made an optimum value, and the ring-shaped band width is made a perfect shape, is also included.

Figure 2:
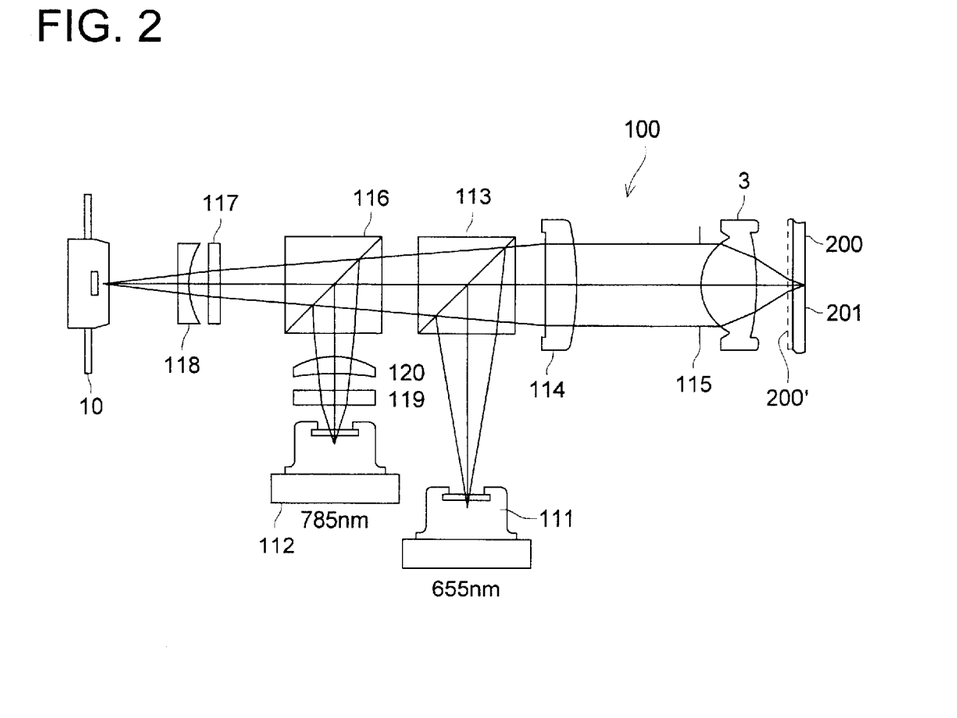
FIG. 2 is an outline structural view of the optical pick-up device according to the first embodiment.

FIG. 2 is an outline structural view of an optical pick-up device according to the first embodiment. In the optical pick-up device 100 shown in FIG. 2, the first semiconductor laser 111 which is the first light source, and the second semiconductor laser 112 which is the second light source are parallely arranged. The luminous flux from the first semiconductor laser 111 of the wavelength $\lambda 1$ (=655 nm) is incident on the collimator 114 through a beam splitter 113, and further, is stopped by the aperture 115 (a predetermined numerical aperture NA1) and converged onto the information recording surface 201 of the first optical information recording medium, that is, the optical disk 200 (for example, DVD: transparent substrate thickness ti) by the objective lens 3.

The reflected light from the information recording surface is converged onto the light receiving surface of a photo detector 10 through an objective lens 3, aperture 115, collimator 114, beam splitters 113, 116, cylindrical lens 117, and concave lens 118. According to the received light, the photo detector 10 generates a detection signal.

In contrast to this, the luminous flux from the second semiconductor laser 112 of the wavelength $\lambda 2$ (=785) is incident on the collimator 114 through a diffractive lattice 119, coupling lens 120, beam splitter 116, and beam splitter 113, and further, is stopped by the aperture 115 and converged onto the information recording surface 201 of the second optical information recording medium, that is, optical disk 200' (for example, CD-R: transparent substrate thickness t2>t1) by the objective lens 3.

The reflected light from the information recording surface is, in the same manner as described above, converged onto the light receiving surface of the photo detector 10 through the objective lens 3, aperture 115, collimator 114, beam splitters 113, 116, cylindrical lens 117, and concave lens 118. According to the received light, the photo detector 10 generates the detection signal. In this connection, as the objective lens 3, examples 1 and 2, which will be described later, may be used.

Incidentally, the diffraction grating 119 generates 0th order light, +first order light and −first order light on the basis of the light flux from the second semiconductor laser 112. At this time, an amount of 0th order light ray becomes larger by several times than that of ±first order light. After, each order light is reflected by the information recording surface 201, the 0th order light having the largest light amount cones to be incident in the central light receiving section 10a of the photo-detector 10 and is used to the detection for the focusing condition. On the other hand, the −first order light and the +first order light come to be incident into the peripheral light receiving section 10b of the photo-detector and are used to the detection for the tracking error.

Figure 3:
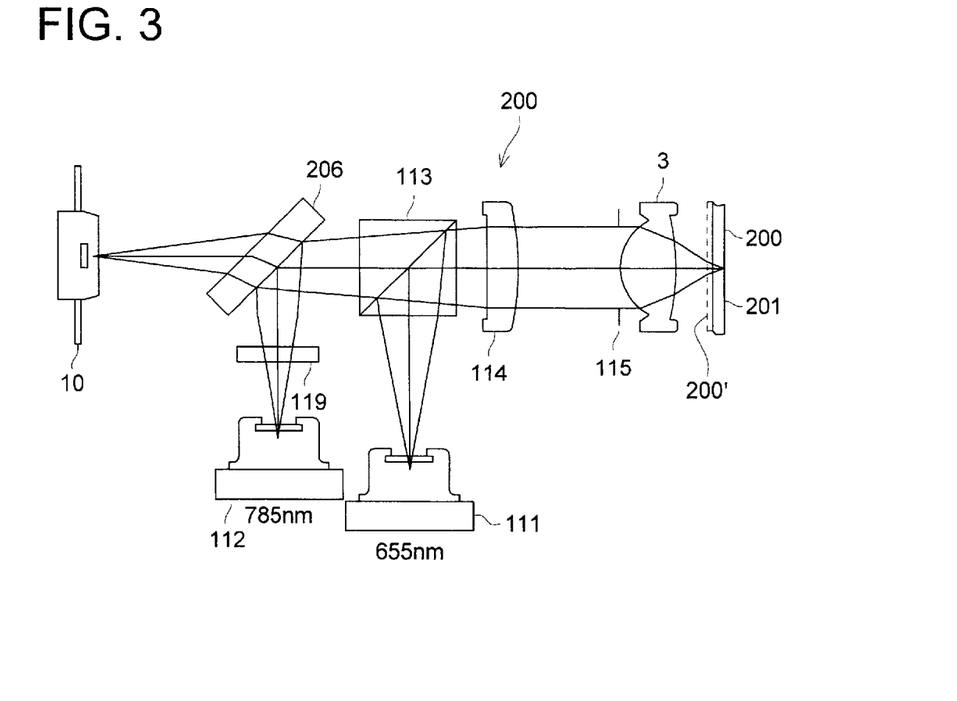
FIG. 3 is an outline structural view of the optical pick-up device according to the second embodiment.

FIG. 3 is an outline structural view of an optical pick-up device according to the second embodiment. In the second embodiment shown in FIG. 3, in contrast to the embodiment in FIG. 2, because only a point in which the coupling lens 120, cylindrical lens 117, and concave lens 118 are omitted, and the beam splitter is replaced with a planer one (206), is different, the description of the other structure will be neglected. In this connection, as the objective lens 3, examples 1 and 2, which will be also described later, can be used. Further, in the first embodiment and the second embodiment, a structure by which the transmitted light is detected by the photo detector 10 by making the information recording surface 201 transparent, may also be possible.

Next, the examples of the objective lens 3 will be described.

Example 1

In [Table 1], data relating to the objective lens in example 1 is shown. In this connection, in the lens data shown hereinafter, an exponent of 10 (for example, $2.5 \times 10^{-3}$) is expressed by using E (for example, 2.5×E−3).

TABLE 1

| Example 1 | | | | |
|---|---|---|---|---|
| wavelength λ (nm) | | 655 | | 785 |
| Focal distance f (mm) | | 3.36 | | 3.38 |
| Image side predetermined numerical aperture NA | | 0.60 | | 0.47 |
| i | ri | d1i | d2i | Material |
| Object point | ∞ | ∞ | ∞ | |
| 1 | | 2.200 | 2.200 | Olefinic resin |
| 2 | −8.5402 | 1.728 | 1.367 | |
| 3 | ∞ | 0.600 | 1.200 | PC |
| 4 | ∞ | | | |

Suffix 1 shows a time of $\lambda$ = 655 nm, and suffix 2 shows a time of $\lambda$ = 785 nm.

The first surface (border hb=1.5885)
  The first area ($0 \leq h < hb$)
  Coefficient of optical path difference function (blazed wavelength=1 mm)

| | |
|---|---|
| $B_2$ | −3.6299E − 02 |
| $B_4$ | 5.1186E − 02 |
| $B_6$ | −1.3732E + 00 |
| $B_8$ | 3.5610E − 01 |
| $B_{10}$ | −3.5952E − 02 |

Aspherical surface coefficient

| | |
|---|---|
| R | 2.0456E + 00 |
| κ | −9.8338E − 01 |
| $A_4$ | 6.3487E − 03 |
| $A_6$ | −1.6489E − 03 |
| $A_8$ | 6.3727E − 04 |
| $A_{10}$ | −8.1296E − 05 |

The second area ($hb \leq h$)
  Coefficient of optical path difference function (blazed wavelength=1 mm)

| | |
|---|---|
| $B_0$ | 2.8259E + 00 |
| $B_2$ | −1.1970E + 00 |

-continued

| | |
|---|---|
| $B_4$ | -6.1240E - 01 |
| $B_6$ | -1.2500E + 00 |
| $B_8$ | 2.7435E - 01 |
| $B_{10}$ | 4.5353E - 04 |

Aspherical surface coefficient

| | |
|---|---|
| R | 2.0445E + 00 |
| κ | -1.0028E + 00 |
| $A_0$ | 1.7890E - 03 |
| $A_4$ | 6.0578E - 03 |
| $A_6$ | -2.2128E - 03 |
| $A_8$ | 7.7587E - 04 |
| $A_{10}$ | -5.9207E - 05 |

The 5th surface
Aspherical surface coefficient

| | |
|---|---|
| κ | 1.4634E + 01 |
| $A_4$ | 1.0692E - 02 |
| $A_6$ | 2.8299E - 03 |
| $A_8$ | -1.6221E - 03 |
| $A_{10}$ | 2.3415E - 04 |

Figure 4:
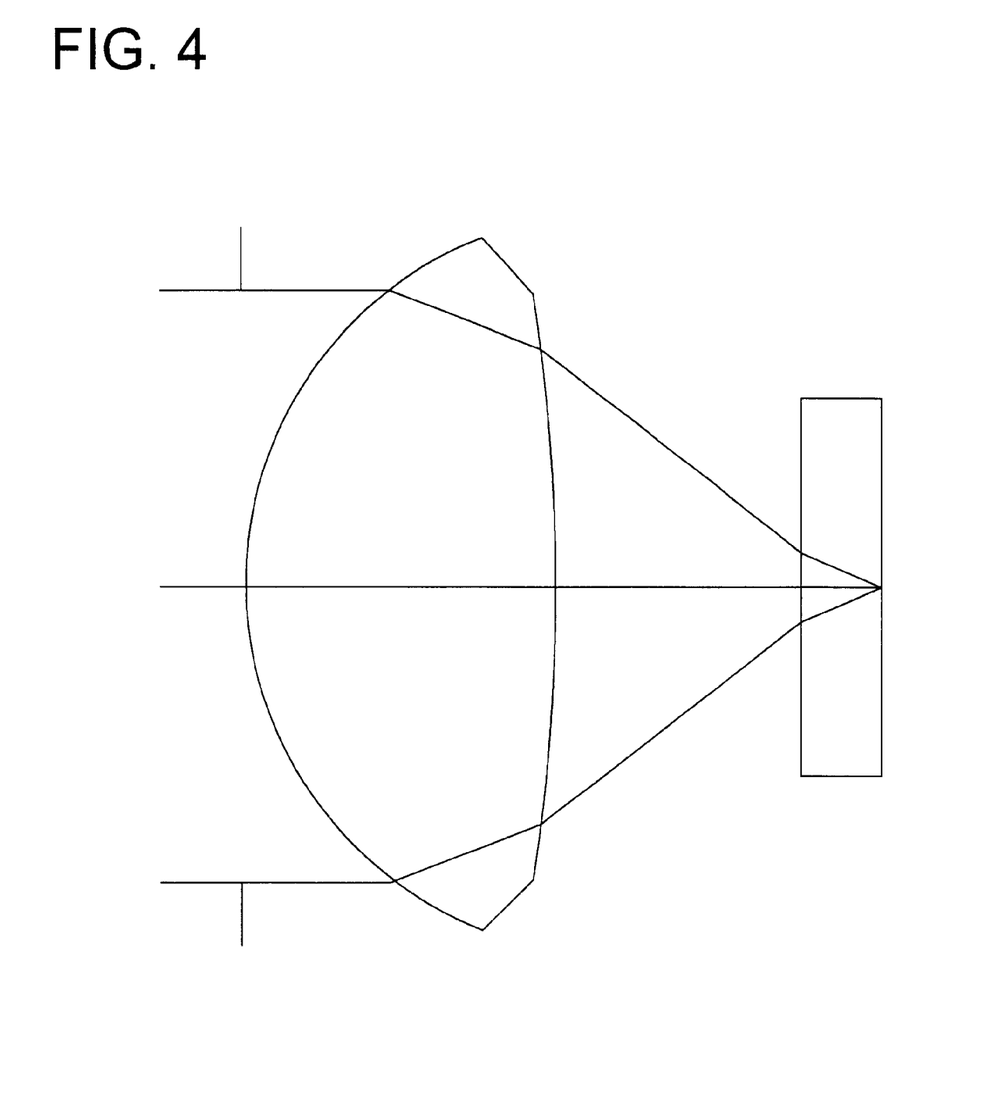
FIG. 4 is a sectional view of the objective lens of the example 1.
Figure 5A:
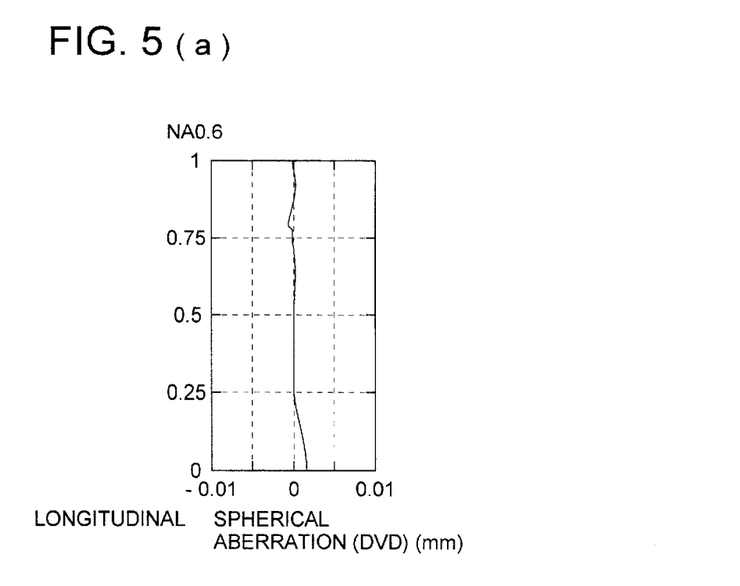
FIGS. 5(a) and 5(b) each is a longitudinal spherical aberration view of the objective lens of the example 1.

FIG. 4 is a sectional view of the objective lens of example 1, and FIG. 5 is a longitudinal spherical aberration view of the objective lens of example 1. According to FIG. 5(a), when the recording or reproducing of the information is conducted on the DVD as the optical disk, the spherical aberration can be finely suppressed for the whole numerical aperture, and an appropriate spot light can be formed.

Figure 5B:
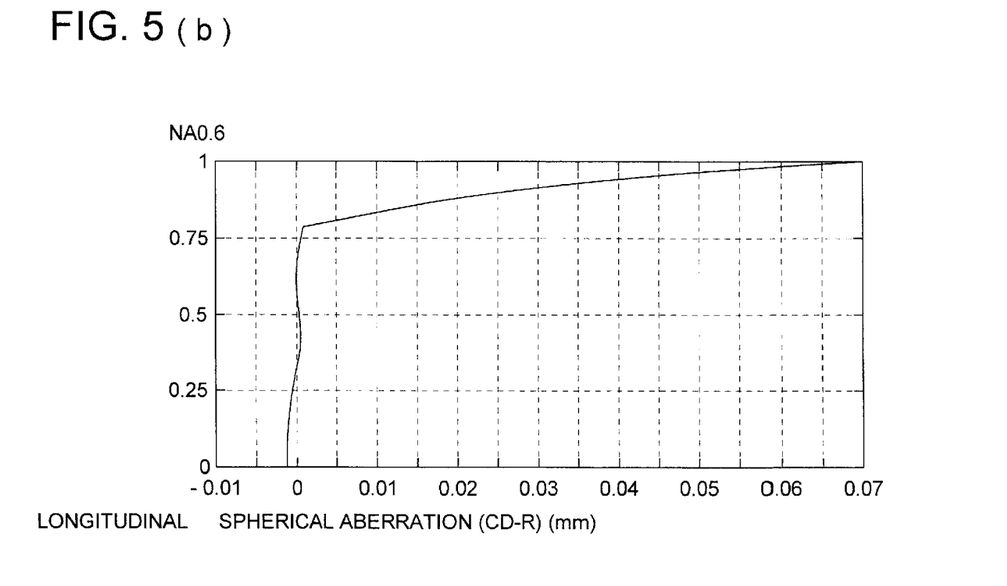

On the one hand, according to FIG. 5(b), when the recording or reproducing of the information is conducted on the CD-R as the optical disk, the spherical aberration can be finely suppressed in the inside of a predetermined numerical aperture (NA2), and an adequate spot light can be formed, and on the outside of the predetermined numerical aperture, the flare light can be formed.

Example 2

In [Table 2], the data relating to the objective lens 3 in example 2 is shown.

TABLE 2

| Example 2 | | | | |
|---|---|---|---|---|
| wavelength λ (nm) | 655 | 785 | | |
| Focal distance f (mm) | 3.36 | 3.36 | | |
| Image side predetermined numerical aperture NA | 0.60 | 0.47 | | |
| i | ri | d1i | d2i | Material |
| Object point | ∞ | ∞ | ∞ | |
| 1 | | 2.200 | 2.200 | Olefinic resin |
| 2 | -8.1838 | 1.738 | 1.353 | |
| 3 | ∞ | 0.600 | 1.200 | PC |
| 4 | ∞ | | | |

Suffix 1 shows a time of λ = 655 nm, and suffix 2 shows a time of λ = 785 nm.

The first surface (border hb=1.5885)
 The first area (0≦h<hb)
  Coefficient of optical path difference function (blazed wavelength=1 mm)

| | |
|---|---|
| $B_2$ | -7.4570E + 00 |
| $B_4$ | -1.1222E + 00 |
| $B_6$ | -1.0023E + 00 |
| $B_8$ | 3.8851E - 01 |
| $B_{10}$ | -6.2331E - 02 |

Aspherical surface coefficient

| | |
|---|---|
| R | 2.1417E + 00 |
| κ | -1.0385E + 00 |
| $A_4$ | 4.9605E - 03 |
| $A_6$ | -1.1764E - 03 |
| $A_8$ | 6.7389E - 04 |
| $A_{10}$ | -1.1849E - 04 |

The second area (hb≦h)
 Coefficient of optical path difference function (blazed wavelength=1 mm)

| | |
|---|---|
| $B_0$ | 7.8810E - 01 |
| $B_2$ | -2.6734E + 00 |
| $B_4$ | -6.5116E - 01 |
| $B_6$ | -1.2583E + 00 |
| $B_8$ | 2.6767E - 01 |
| $B_{10}$ | -4.1770E - 03 |

Aspherical surface coefficient

| | |
|---|---|
| R | 2.0695E + 00 |
| κ | -1.0275E + 00 |
| $A_0$ | 1.6500E - 04 |
| $A_4$ | 5.7251E - 03 |
| $A_6$ | -2.1795E - 03 |
| $A_8$ | 7.7712E - 04 |
| $A_{10}$ | -7.0727E - 05 |

The 5th surface
Aspherical surface coefficient

| | |
|---|---|
| κ | 1.4551E + 01 |
| $A_4$ | 1.1869E - 02 |
| $A_6$ | 2.7555E - 03 |
| $A_8$ | -1.6723E - 03 |
| $A_{10}$ | 2.6001E - 04 |

Figure 6:
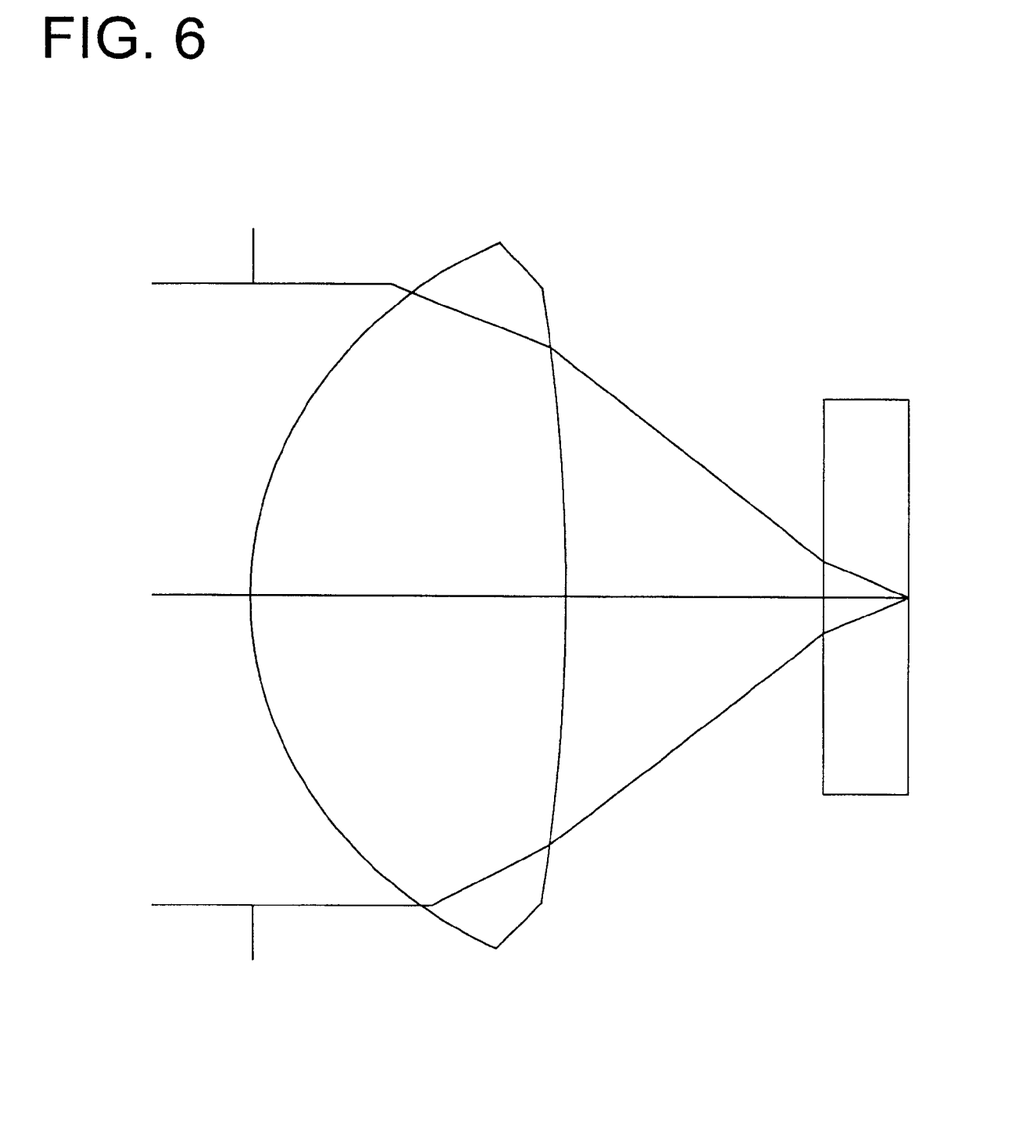
FIG. 6 is a sectional view of the objective lens of the example 2.
Figure 7A:
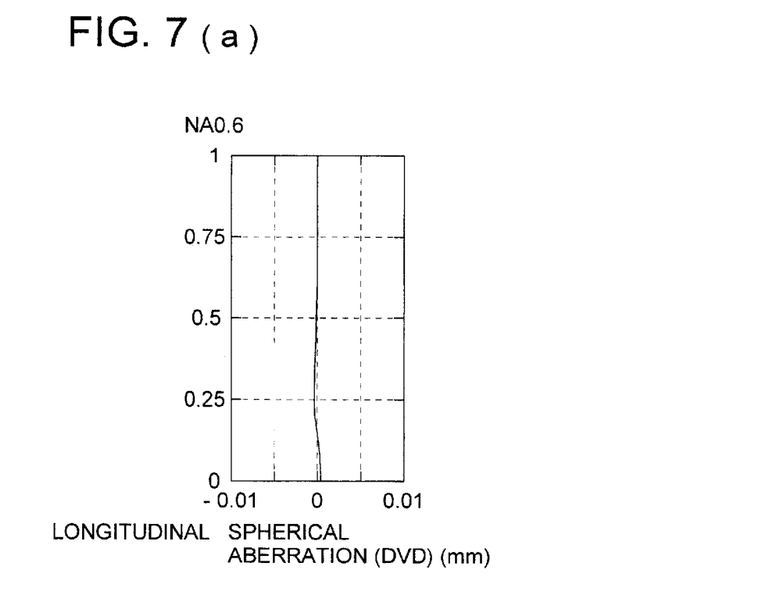
FIGS. 7(a) and 7(b) each is a longitudinal spherical aberration view of the objective lens of the example 2.

FIG. 6 is a sectional view of the objective lens of example 2, and FIG. 7 is a longitudinal spherical aberration view of the objective lens of example 2. According to FIG. 7(a), when the recording or reproducing of the information is conducted on the DVD as the optical disk, the spherical aberration can be finely suppressed for the whole numerical aperture, and an adequate spot light can be formed.

Figure 7B:
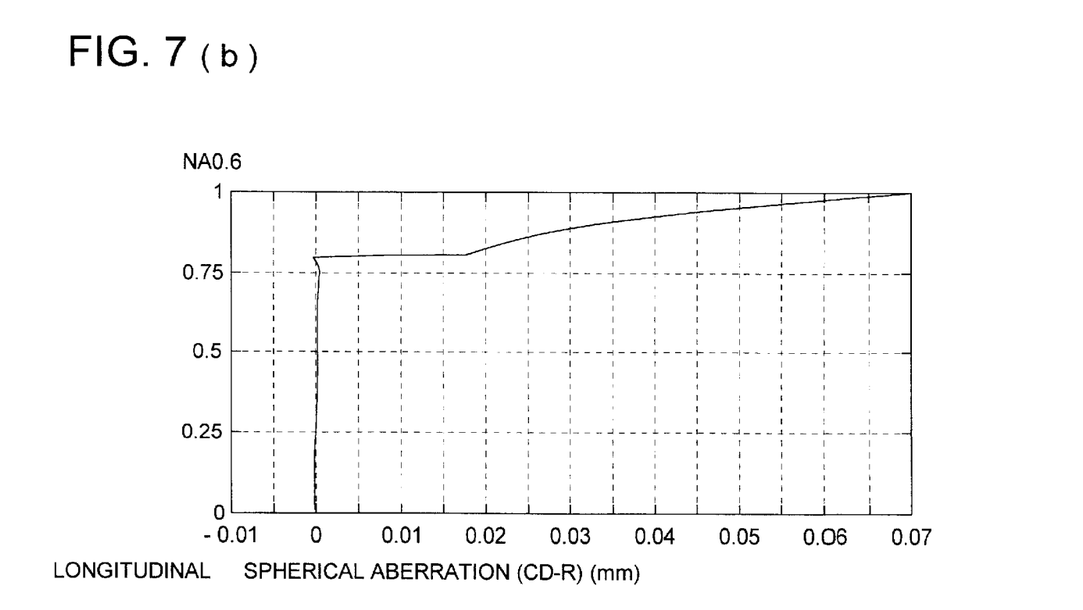

On the one hand, according to FIG. 7(b), when the recording or reproducing of the information is conducted on the CD-R as the optical disk, the spherical aberration can be finely suppressed in the inside of a predetermined numerical aperture (NA2), and an adequate spot light can be formed, and on the outside of the predetermined numerical aperture, the flare light can be formed.

[Table 3] is the refractive index data in the objective lens of examples 1 and 2, and [Table 4] shows the inner diameter D2 and the outer diameter D1 of the flare light formed on the information recording surface 201 (FIGS. 2 and 3) when the objective lens of examples 1 and 2 is used.

TABLE 3

| | Refractive index | |
|---|---|---|
| Wavelength | 655 nm | 785 nm |
| Olefinic resin | 1.52915 | 1.52541 |
| PC | 1.57752 | 1.57063 |

TABLE 4

| Flare diameter on the information recording surface (wavelength 785 nm) | | |
|---|---|---|
| | Example 1 | Example 2 |
| Inner diameter D2 ($\mu$m) | 0 | 18 |
| Outer diameter D1 ($\mu$m) | 101 | 101 |

According to the present invention, although small number of optical elements or objective lenses are used, the optical pick-up device and the objective lens used therefor by which the recording of the information and/or reproducing (hereinafter, simply called recording and reproducing) can be conducted on the optical information recording media having different thickness, and the false detection can be suppressed, can be provided.

What is claimed is:

1. An optical pickup apparatus for reproducing information from or recording information in at least two kinds of optical information recording medium, comprising:

a first light source to emit a first light flux having a first wavelength $\lambda 1$ a second light source to emit a second light flux having a second wavelength $\lambda 2$ ($\lambda 2 > \lambda 1$);

a converging optical system having an objective lens provided with a diffractive section, to converge the first light flux emitted from the first light source through a transparent base board of a first optical information recording medium onto a recording surface and to converge the second light flux emitted from the second light source through a transparent base board of a second optical information recording medium onto a recording surface;

an optical detector to receive a reflected light flux and/or a transmitted light flux from the first and second optical information recording medium;

wherein the first light flux is irradiated to reproduce information from or to record information in the first optical information recording medium including a transparent base board having a thickness of t1 and the second light flux is irradiated to reproduce information from or to record information in the second optical information recording medium including a transparent base board having a thickness of t2 (t2>t1);

wherein when a numerical aperture NA1 is a numerical aperture at an image side of the objective lens and necessary to reproduce information from or record in the first optical information recording medium, the converging optical system converges the first light flux on the information recording surface of the first optical information recording medium within the numerical aperture NA1 on a condition that wavefront aberration is 0.07$\lambda$1 rms or less, and when a numerical aperture NA2 (NA2<NA1) is a numerical aperture at an image side of the objective lens and necessary to reproduce information from or record in the second optical information recording medium, the converging optical system converges the second light flux on the information recording surface of the second optical information recording medium within the numerical aperture NA2 on a condition that wavefront aberration is 0.07$\lambda$2 rms or less, wherein the optical detector comprises a central light receiving section to detect a focusing condition and a peripheral light receiving section to detect a tracking error, and when information is reproduced from or recorded in the second optical information recording medium, a reflected light flux of the second light flux reflected from or a transmitted light flux of the second light flux transmitted through the second optical information recording medium is irradiated so as to cover the entire surface of the peripheral light receiving section.

2. The optical pickup apparatus of claim 1, wherein when information is reproduced from or recorded in the second optical information recording medium, the second light flux is separated into an inner second light flux passing the inside of the numerical aperture NA2 and an outer second light flux passing the outside of the numerical aperture NA2, and wherein the reflected light flux of the outer second light flux reflected from or the transmitted light flux of the outer second light flux transmitted through the second optical information recording medium is shaped in a ring-shaped light flux, the inner periphery of the ring-shaped light flux is located an inside of the innermost edge of the peripheral light receiving section and the outer periphery of the ring-shaped light flux is located an outside of the outermost edge of the peripheral light receiving section.

3. The optical pickup apparatus of claim 2, wherein an inside diameter of the ring-shaped light flux on the information recording surface is 20 $\mu$m or less.

4. The optical pickup apparatus of claim 3, wherein an inside diameter of the ring-shaped light flux is 10 to 20 $\mu$m.

5. The optical pickup apparatus of claim 1, wherein when information is reproduced from or recorded in the second optical information recording medium, the second light flux is separated into an inner second light flux passing the inside of the numerical aperture NA2 and an outer second light flux passing the outside of the numerical aperture NA2, and wherein the reflected light flux of the outer second light flux reflected from or the transmitted light flux of the outer second light flux transmitted through the second optical information recording medium is shaped in a ring-shaped light flux, and the inner periphery of the ring-shaped light flux is located an outside of the central light receiving section.

6. The optical pickup apparatus of claim 1, wherein the following formula is satisfied:

$$(D1-D2)/2 > 15 \, \mu m$$

where D1 is an outer diameter of the ring-shaped light flux on the information recording surface and D2 is an inner diameter of the ring-shaped light flux on the information recording surface.

7. The optical pickup apparatus of claim 1, wherein the reflected light flux of the first light flux reflected from and/or the transmitted light flux of the first light flux transmitted through the first optical information recording medium after the first light flux have passed through the objective lens and the reflected light flux of the second flux reflected from and/or the transmitted light flux of the second flux transmitted through the second optical information recording medium after the second light flux have passed through the inside of the numerical aperture NA2 of the objective lens are irradiated in a form of spot light in the central light receiving section.

8. An objective lens for use in an optical pickup apparatus for reproducing information from or recording information in at least two kinds of optical information recording medium, the optical pickup apparatus comprising:

a first light source to emit a first light flux having a first wavelength $\lambda 1$;

a second light source to emit a second light flux having a second wavelength $\lambda 2$ ($\lambda 2 > \lambda 1$);

a converging optical system having the objective lens provided with a diffractive section, to converge the first light flux emitted from the first light source through a transparent base board of a first optical information recording medium onto a recording surface and to converge the second light flux emitted from the second light source through a transparent base board of a second optical information recording medium onto a recording surface;

an optical detector to receive a reflected light flux and/or a transmitted light flux from the first and second optical information recording medium;

wherein the first light flux is irradiated to reproduce information from or to record information in the first optical information recording medium including a transparent base board having a thickness of t1 and the second light flux is irradiated to reproduce information from or to record information in the second optical information recording medium including a transparent base board having a thickness of t2 (t2>t1);

wherein when a numerical aperture NA1 is a numerical aperture at an image side of the objective lens and necessary to reproduce information from or record in the first optical information recording medium, the converging optical system converges the first light flux on the information recording surface of the first optical information recording medium within the numerical aperture NA1 on a condition that wavefront aberration is $0.07\lambda 1$ rms or less, and when a numerical aperture NA2 (NA2<NA1) is a numerical aperture at an image side of the objective lens and necessary to reproduce information from or record in the second optical information recording medium, the converging optical system converges the second light flux on the information recording surface of the second optical information recording medium within the numerical aperture NA2 on a condition that wavefront aberration is $0.07\lambda 2$ rms or less, wherein the optical detector comprises a central light receiving section to detect a focusing condition and a peripheral light receiving section to detect a tracking error, and when information is reproduced from or recorded in the second optical information recording medium, a reflected light flux of the second light flux reflected from or a transmitted light flux of the second light flux transmitted through the second optical information recording medium is irradiated so as to cover the entire surface of the peripheral light receiving section.

9. The objective lens of claim 8, wherein when information is reproduced from or recorded in the second optical information recording medium, the second light flux is separated into an inner second light flux passing the inside of the numerical aperture NA2 and an outer second light flux passing the outside of the numerical aperture NA2, and wherein the reflected light flux of the outer second light flux reflected from or the transmitted light flux of the outer second light flux transmitted through the second optical information recording medium is shaped in a ring-shaped light flux, the inner periphery of the ring-shaped light flux is located an inside of the innermost edge of the peripheral light receiving section and the outer periphery of the ring-shaped light flux is located an outside of the outermost edge of the peripheral light receiving section.

10. The objective lens of claim 9, wherein an inside diameter of the ring-shaped light flux on the information recording surface is 20 $\mu$m or less.

11. The objective lens of claim 10, wherein an inside diameter of the ring-shaped light flux is 10 to 20 $\mu$m.

12. The objective lens of claim 8, wherein when information is reproduced from or recorded in the second optical information recording medium, the second light flux is separated into an inner second light flux passing the inside of the numerical aperture NA2 and an outer second light flux passing the outside of the numerical aperture NA2, and wherein the reflected light flux of the outer second light flux reflected from or the transmitted light flux of the outer second light flux transmitted through the second optical information recording medium is shaped in a ring-shaped light flux, and the inner periphery of the ring-shaped light flux is located an outside of the central light receiving section.

13. The objective lens of claim 8, wherein the following formula is satisfied:

$$(D1-D2)/2 > 15 \,\mu m$$

where D1 is an outer diameter of the ring-shaped light flux on the information recording surface and D2 is an inner diameter of the ring-shaped light flux on the information recording surface.

14. The objective lens of claim 8, wherein the reflected light flux of the first light flux reflected from and/or the transmitted light flux of the first light flux transmitted through the first optical information recording medium after the first light flux have passed through the objective lens and the reflected light flux of the second flux reflected from and/or the transmitted light flux of the second flux transmitted through the second optical information recording medium after the second light flux have passed through the inside of the numerical aperture NA2 of the objective lens are irradiated in a form of spot light in the central light receiving section.

15. The optical pickup apparatus of claim 1, further comprising:

an optical member to generate plural different order light fluxes including n-th and m-th order light fluxes based on the second light flux, wherein after the n-th order light flux has passed through an inside of the numerical aperture NA2 of the objective lens, the central light receiving section receives the reflected light flux of the n-th order light flux reflected from and/or the transmitted light flux of the n-th order light flux transmitted through the second optical information recording medium, and after the m-th order light flux has passed through an outside of the numerical aperture NA2 of the objective lens, the peripheral light receiving section receives the reflected light flux of the m-th order light flux reflected from and/or the transmitted light flux of the m-th order light flux transmitted through the second optical information recording medium.

16. The optical pickup apparatus of claim 15, wherein after the n-th order light flux has passed through an outside of the numerical aperture NA2 of the objective lens, the reflected light flux of the n-th order light flux reflected from and/or the transmitted light flux of the n-th order light flux transmitted through the second optical information recording medium is irradiated to cover an entire surface of the peripheral light receiving section.

17. The optical pickup apparatus of claim 15, wherein the optical member is a diffraction grating provided between the second light source and the converging optical system.

18. The objective lens of claim 8, wherein the optical pickup apparatus further comprises:

an optical member to generate plural different order light fluxes including n-th and m-th order light fluxes based on the second light flux, wherein after the n-th order light flux has passed through an inside of the numerical aperture NA2 of the objective lens, the central light receiving section receives the reflected light flux of the n-th order light flux reflected from and/or the transmitted light flux of the n-th order light flux transmitted through the second optical information recording medium, and after the m-th order light flux has passed through an outside of the numerical aperture NA2 of the objective lens, the peripheral light receiving section receives the reflected light flux of the m-th order light flux reflected from and/or the transmitted light flux of the m-th order light flux transmitted through the second optical information recording medium.

19. The objective lens of claim 18, wherein after the n-th order light flux has passed through an outside of the numerical aperture NA2 of the objective lens, the reflected light flux of the n-th order light flux reflected from and/or the transmitted light flux of the n-th order light flux transmitted through the second optical information recording medium is irradiated to cover an entire surface of the peripheral light receiving section.

20. The optical pickup apparatus of claim 18, wherein the optical member is a diffraction grating provided between the second light source and the converging optical system.

* * * * *